UNITED STATES PATENT OFFICE.

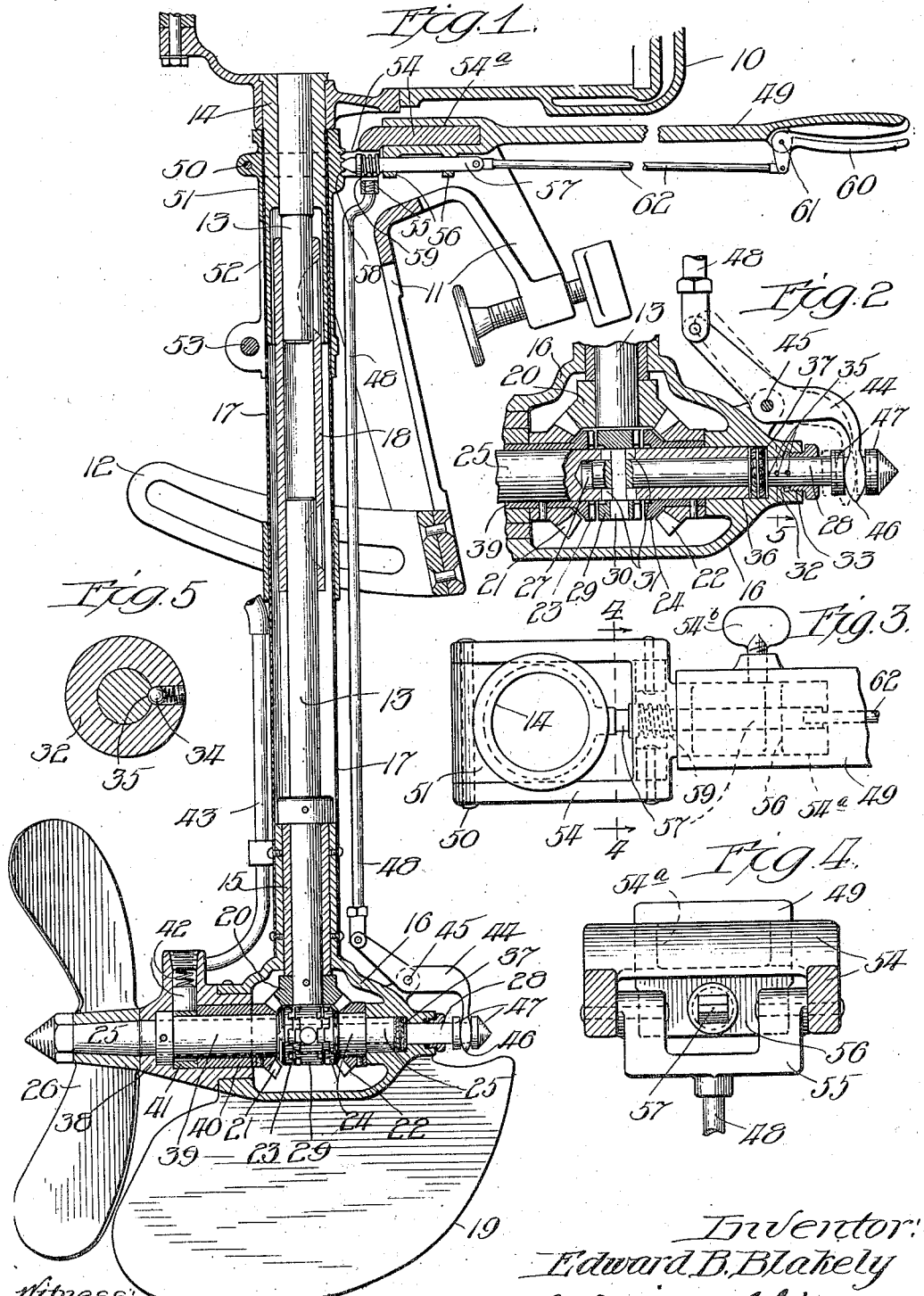

EDWARD B. BLAKELY, OF MUSKEGON, MICHIGAN, ASSIGNOR TO SEARS, ROEBUCK AND COMPANY, OF CHICAGO, ILLINOIS, A CORPORATION OF NEW YORK.

BOAT-MOTOR.

1,192,377.  Specification of Letters Patent.  Patented July 25, 1916.

Application filed June 24, 1915. Serial No. 36,007.

*To all whom it may concern:*

Be it known that I, EDWARD B. BLAKELY, a citizen of the United States, residing at Muskegon, in the county of Muskegon and State of Michigan, have invented certain new and useful Improvements in Boat-Motors, of which the following is a specification.

This invention relates to a propelling device, commonly known as boat motor, of the type comprising a driving engine and a propeller associated together in a unitary structure which is adapted to be attached to the stern of a row-boat or other small craft for propelling the latter through the water.

The object of the invention is to produce an improved propelling device of this character in which the engine may be started without driving the propeller, and in which the propeller may be stopped or reversed independently of the engine.

The invention also refers to means whereby the starting, stopping or reversing of the propeller may be conveniently effected from the tiller.

In the accompanying drawings, Figure 1 is a vertical central section through a boat motor embodying the features of my invention, the major portion of the engine proper being omitted. Fig. 2 is a sectional view on an enlarged scale of certain parts shown at the lower end of Fig. 1. Fig. 3 is a fragmental plan view in a plane just beneath the engine, illustrating the tiller and its mounting. Fig. 4 is a vertical section on line 4—4 of Fig. 3. Fig. 5 is a sectional detail view on line 5 of Fig. 2.

Inasmuch as the present invention does not relate to the engine proper, only a small fragment 10 thereof has been shown in Fig. 1. The structure as a whole is arranged to be attached to the stern of a boat by means of the usual clamping bracket 11 which carries at its lower end a pair of slotted arms 12 having an adjustable connection with the structure, whereby the latter may be set at different angles with respect to the attaching bracket 11 in a manner well known.

13 is an upright drive-shaft, the upper end of which is mounted in a bearing 14 on the engine and is driven by the latter and the lower end of which is mounted in a bearing 15 fixed to a gear casing 16. These two bearings are connected by a tube 17 which surrounds the drive-shaft 13. If desired, this shaft may be formed in two sections coupled together by a sleeve 18 which is keyed to the two sections. The upper section may be a part of the crank-shaft of the engine. Beneath the gear casing 16 is fixed a rudder-plate 19.

On the lower end of the drive-shaft 13 within the gear casing 16 is fixed a bevel gear 20 which is in constant mesh with two opposed bevel gears 21 and 22. These two latter gears are rigidly pinned to two opposed clutch elements 23 and 24, said gears and clutch elements being rotatably mounted upon a transverse propeller shaft 25 having a propeller 26 fixed on its outer end behind the rudder-plate 19. The inner end of this shaft has a central bore 27 (Fig. 2) in which is slidably mounted a clutch shifter rod 28. A double-face clutch element 29 surrounds the propeller shaft 25 between the two clutch elements 23 and 24 and is arranged to be slid into clutch engagement with either of the latter elements. A crosspin 30 seated in the slidable clutch element 29 passes through slots 31 in the propeller shaft and fits in an opening in the shifter rod 28, whereby the slidable clutch element is rigidly secured to said shifter rod. By sliding the clutch element 29 into engagement with the coöperating elements 23 or 24, the propeller may be driven in opposite directions. When the shiftable clutch element is in its central position, it is out of engagement with both of the opposing clutch elements and the propeller is idle. The shifter rod 28 slides in a bearing 32 in the gear casing 16 and through a stuffing box 33. If desired, a spring-pressed ball or dog 34 (Fig. 5) may be seated in the bearings 32 of the gear casing in position to coöperate with three recesses 35 (Fig. 2) in the shifter rod 28, said ball yieldingly holding the shifter rod in any one of its three positions.

The inner end of the propeller shaft 25 is mounted in a bearing 36 in the gear casing, and between the end of the shaft and the end wall of the bearing is preferably placed a series of anti-friction balls 37 to take care of the end thrust on the shaft. The opposite end portion of the propeller shaft is mounted partially in a bearing 38 in the gear casing and partially in the extended sleeve or hub 39 of the clutch element 23, which in turn is mounted in a bearing 40 in the gear casing.

An eccentric 41 surrounds and is keyed to the sleeve or hub 39 between the bearing 40 and a collar 41ᵃ fixed on the propeller shaft 25. Said eccentric 41 is arranged to operate a pump 42 which forces water through a pipe 43 and circulates the water through the jacket of the engine cylinder 10. Inasmuch as the sleeve or hub 39 is constantly driven by the drive-shaft 13, the pump will be actuated whether the propeller is idle or is running forward or backward.

The clutch shifter rod 28 is arranged to be manually operated to start, stop or reverse the propeller 26 by means to be now described. A lever 44 is pivoted at 45 on the gear casing 16 and has an angular forked end 46 engaging between two collars 47 on the outer end of the shifter rod 28. The opposite end of this lever is connected by a long vertical link 48 with the horizontal tiller 49 operated by the steersman. This tiller is pivoted at 50 for movement up and down, to a sleeve 51 which surrounds and is rigidly fixed to the tube 17, said sleeve and tube being rotatable by the tiller to turn the rudder 19 and propeller 26 on the axis of the engine shaft. If desired, the sleeve 51 may be slotted as at 52 so that it may be compressed upon the tube 17 by a bolt 53. The tiller 49 comprises a yoke 54 which straddles the sleeve 51 and has a shank fitting in a socket 54ᵃ in the body portion of the tiller and detachably fixed therein by a set screw 54ᵇ. The upper end of the link 48 has a yoke member 55 which is pivoted to the sides of the yoke 54, as shown in Fig. 4. The tiller 49 also has suitable depending lugs 56 apertured to provide guides for a slidable dog 57, one end of which is arranged to engage in a series of notches 58 in the sleeve 51 to hold the tiller in different set positions. A coiled spring 59 surrounds the dog and acts between a collar thereon and one of the lugs 56 so as to press the dog toward said notches. The dog is arranged to be withdrawn by means of a bell-crank lever 60 pivoted at 61 on the outer end of the tiller and connected to the dog by a link 62.

It will be seen that by operating the dog 57 and shifting the tiller 49 up and down, the propeller 26 may be stopped or reversed independently of the engine.

When the motor is to be carried or packed for shipment, the set screw 54ᵇ may, if desired, be loosened and the tiller 49 withdrawn from the yoke 54. The dog 57 is supported by the tiller and is therefore withdrawable with the latter.

While I have herein described the preferred embodiment of my invention in considerable detail, I do not thereby intend to limit the invention to the precise structure shown in the drawings, but aim to cover in the appended claims all modifications and equivalents falling within the scope of the invention.

I claim as my invention:

1. A boat motor having, in combination, an engine, an upright drive-shaft rotated thereby, a depending bearing on the engine in which the upper end of said shaft is mounted, an axially rotatable tube surrounding said shaft and receiving said bearing in its upper end, a second bearing fixed in the lower end of said tube in which said shaft is mounted, a gear casing fixed with relation to the lower end of said tube and said lower bearing, a rudder-plate fixed to said gear casing beneath the latter, a transverse shaft mounted in said gear casing, a propeller fixed on one end of the latter shaft, a bevel gear fixed on the lower end of said drive-shaft, two opposed bevel gears meshing with the mentioned gear and rotatably mounted on said propeller shaft, two clutch elements fixed respectively to the two latter bevel gears, an intermediate clutch element slidably surrounding said propeller shaft, a slidable clutch shifter rod fixed with relation to said intermediate clutch element, a tiller for rotating said tube, said tiller being pivoted to the tube for swinging movement in a vertical plane, and connections between the tiller and said shifter rod for sliding the latter by vertical swinging movement of the tiller.

2. A boat motor having, in combination, an engine, a bearing thereon, a rotatable tubular device receiving said bearing in its upper end, a bearing in the lower end of said tubular device, a drive-shaft rotated by the engine and mounted in said bearings within said tubular device, a gear casing fixed with relation to the lower end of said tubular device, a rudder fixed with relation to said gear casing, a transverse propeller shaft mounted in said gear casing, a propeller fixed on said propeller shaft, a disengageable connection between said two shafts, a shifter element slidable in said gear casing for operating said connection, a pivoted lever arranged to slide said shifter element, a vertical link connected at its lower end to said lever, a tiller pivoted at the upper end of said tubular device for swinging movement up and down and arranged to rotate said tubular device, the upper end of said link being attached to said tiller, a manually operable dog carried by said tiller, and a series of teeth on said tubular device coöperating with said dog.

3. A boat motor having, in combination, a drive shaft, an axially-rotatable tube inclosing the shaft, a sleeve rigidly connected to the upper portion of the tube, a yoke pivoted to the sleeve for swinging movement in a vertical plane, a tiller detachably connected to the yoke, and a locking device movably supported upon the detachable tiller and arranged to engage coacting locking means on the sleeve.

4. A boat motor having, in combination, a drive shaft, a propeller, reversible clutch means for connecting said shaft and propeller, an axially-rotatable tube inclosing the shaft, a sleeve rigidly connected to the upper portion of the tube, a yoke pivoted to the sleeve for swinging movement in a vertical plane, a link connected to the clutch means and to the yoke, a tiller detachably connected to the yoke, and means for locking the yoke in vertically adjusted position.

5. A boat motor having, in combination, an engine, a drive-shaft rotated thereby, a propeller shaft, a propeller on the latter shaft, a disengageable connection between said two shafts, means for operating said connection, a link connected at its lower end to said means, a hand-lever pivoted adjacent to said engine, the upper end of said link being operatively connected to said hand-lever, a manually operable dog carried by said hand-lever, and stationary teeth to coöperate with said dog for holding the hand-lever in different positions.

In testimony whereof, I hereunto set my hand in the presence of two witnesses.

EDWARD B. BLAKELY.

In the presence of—
FLORENCE LINDEN,
HENRY YOUNG.